US005595394A

United States Patent [19]
Adamson

[11] Patent Number: 5,595,394
[45] Date of Patent: Jan. 21, 1997

[54] WHEELED CART WITH CHILD SEAT PROVIDING BAG-HANGING DIVIDERS

[75] Inventor: Mark Adamson, Broken Arrow, Okla.

[73] Assignee: Unarco LLC, Atlanta, Ga.

[21] Appl. No.: 398,550

[22] Filed: Mar. 6, 1995

Related U.S. Application Data

[63] Continuation-in-part of Ser. No. 33,889, Jan. 23, 1995, Pat. No. Des. 365,904.

[51] Int. Cl.[6] .................................. B62B 3/14; B62B 5/08
[52] U.S. Cl. .................................. 280/33.993; 280/47.35; 280/79.2; 297/467; D34/21
[58] Field of Search .................. 280/33.992, 33.993, 280/47.35, 79.2; D34/17, 21; 297/256.17, 467

[56] References Cited

U.S. PATENT DOCUMENTS

| D. 363,589 | 10/1995 | Lafleur et al. | D34/21 |
|---|---|---|---|
| D. 365,904 | 1/1996 | Adamson et al. | D34/17 |
| 3,023,018 | 2/1962 | Welter | 280/33.993 |
| 3,885,806 | 5/1975 | Trubiano | 280/33.993 |
| 4,381,870 | 5/1983 | Muellner | 280/33.993 |
| 5,103,985 | 4/1992 | Davis | D34/21 X |
| 5,149,114 | 9/1992 | Lewandowski et al. | 280/33.992 |
| 5,385,357 | 1/1995 | Trubiano | 280/33.993 |
| 5,435,582 | 7/1995 | Davidson | 280/33.992 |

OTHER PUBLICATIONS

Unarco Commercial Products brochure, front and back pages, "Unarco Luggage Carts" (undated).
Unarco Commercial Products brochure, "Unarco Bryt–Line Nesting Carry–Out Karts Model NKA–2–" (undated).

*Primary Examiner*—Brian L. Johnson
*Attorney, Agent, or Firm*—Dressler, Goldsmith, Milnamow & Katz, Ltd.

[57] ABSTRACT

A wheeled cart, such as a luggage cart, comprises a wheeled chassis and a handle portion extending upwardly from the wheeled chassis and having two upright portions spaced laterally from each other and a gripping portion extending laterally between the upright portions and is equipped with a seat for a child. The seat extends between the upright portions and has a bottom portion fixed to the upright portions and a backrest portion hinged to the bottom portion. At least three dividers extend upwardly from the seat and are spaced laterally from one another so as to define open-topped gaps to accommodate the legs of a child sitting on the seat and extending his or her legs through the open-topped gaps. The dividers are shaped so that handles of bags, purses, or like items can be hung over the dividers and, once hung thereover, can be lowered approximately to the bottom portion of the seat. The handle is shaped such that a child sitting on the seat so as to extend his or her legs through the open-topped gaps defined by the dividers faces toward the gripping portion, which tends to restrain the child against falling toward the gripping portion. The bottom and backrest portions of the seat comprise welded wires, which include welded wires having looped portions defining the dividers.

4 Claims, 2 Drawing Sheets

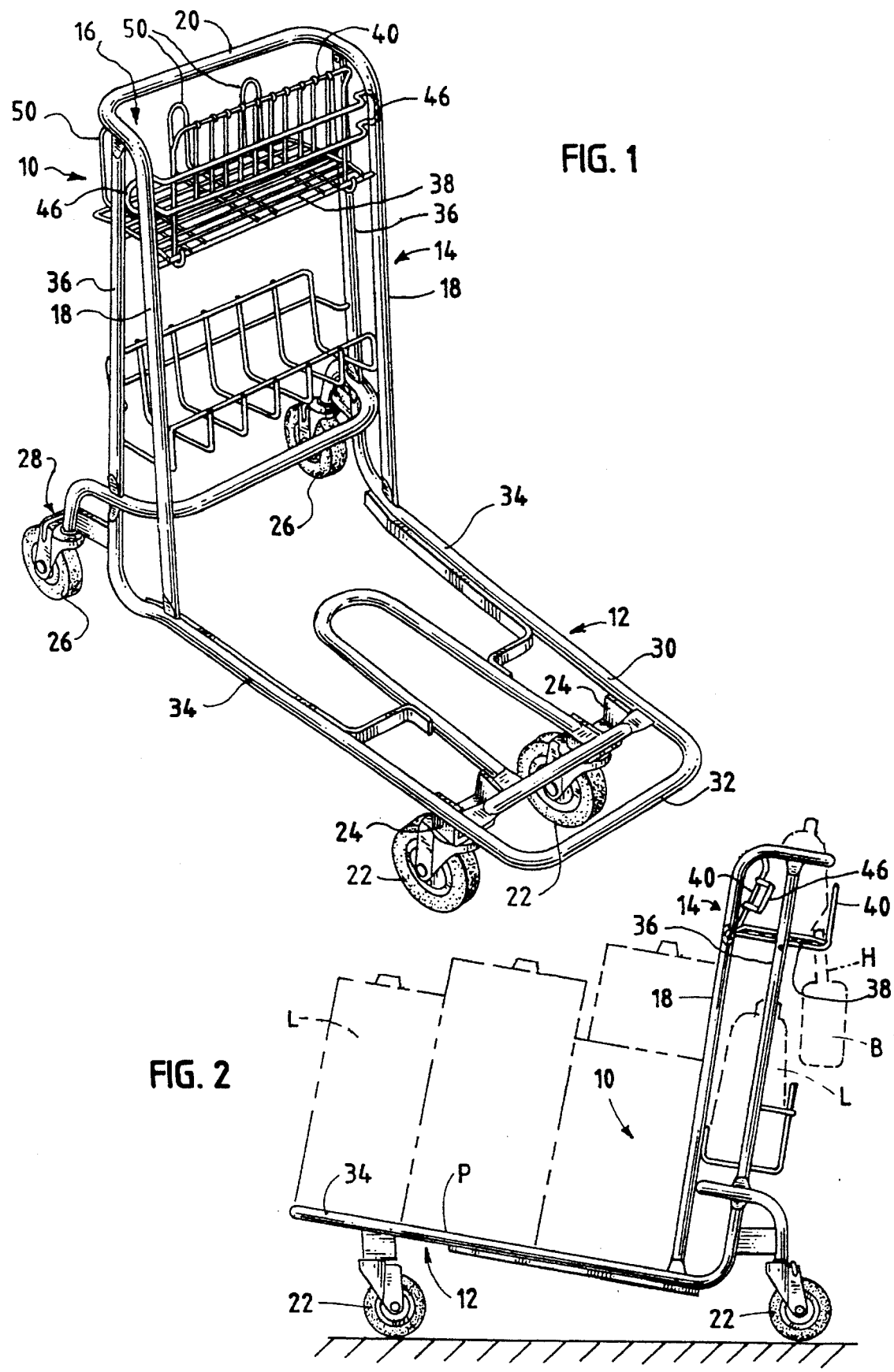

5,595,394

1
WHEELED CART WITH CHILD SEAT PROVIDING BAG-HANGING DIVIDERS

CROSS-REFERENCE TO RELATED APPLICATION

This application is a continuation-in-part of U.S. patent application Ser. No. 29/033,889, which was filed on Jan. 23, 1995, and the disclosure of which is incorporated herein by reference, now U.S. Pat. No. D. 365,904.

TECHNICAL FIELD OF THE INVENTION

This invention pertains to a wheeled cart, such as a luggage cart, which has a seat for a child. At least three dividers extending upwardly from the seat define open-topped gaps to accommodate the legs of a child sitting on the seat and are shaped so that handles of bags, purses, or like items can be hung over the dividers and once hung thereover can be lowered approximately to the seat.

BACKGROUND OF THE INVENTION

Luggage carts of a type comprising a wheeled chassis and a handle extending upwardly from the wheeled chassis and having two upright portions spaced laterally from each other and a gripping portion extending between the upright portions are in widespread use in airports, railway stations, and other transportation terminals.

Commonly, a luggage cart of the type noted above has a seat for a child. Typically, the seat is mounted to the handle so as to extend between the upright portions, near the gripping portion. Commonly, the seat includes a back panel formed of wires framing rectangular openings to accommodate the legs of a child sitting on the seat and extending his or her legs through the framed openings. Sometimes, the seat is used to hold small luggage, rather than a child.

This invention has resulted from efforts to improve luggage carts of the type noted above so as to extend their versatility.

SUMMARY OF THE INVENTION

This invention improves a wheeled cart, such as a luggage cart of the type noted above, which has a seat for a child. This invention contemplates that at least three dividers, which extend upwardly from a bottom portion of the seat and define open-topped gaps to accommodate the legs of a child sitting on the bottom portion of the seat and extending his or her legs through the open-topped gaps, are shaped so that handles of bags, purses, or like items can be hung over the dividers and once hung thereover can be lowered approximately to the bottom portion of the seat.

Preferably, the handle is shaped such that a child sitting on the seat and extending his or her legs through the open-topped gaps defined by the dividers faces toward the gripping portion, which tends to restrain the child against falling toward the gripping portion. Preferably, moreover, the bottom portion of the seat comprises welded wires including wires defining the dividers. Those wires may have looped portions defining the dividers.

This invention can be usefully embodied not only in luggage carts of the type noted above but also in shopping carts of known types.

2

These and other objects, features, and advantages of this invention are evident from the following description of a preferred embodiment of this invention with reference to the accompanying drawings.

BRIEF DESCRIPTION OF THE DRAWINGS

FIG. 1 is a perspective view of a luggage cart equipped with a seat for a child and constituting a preferred embodiment of this invention.

FIG. 2 is a fragmentary, perspective detail showing a bottom portion of the seat and a handle of the luggage cart and showing, in broken lines, a child sitting on the bottom portion and a bag with a handle hung over one of three dividers extending upwardly from the bottom portion and with the handle lowered approximately to the seat.

DETAILED DESCRIPTION OF THE PREFERRED EMBODIMENT

Figure 3:
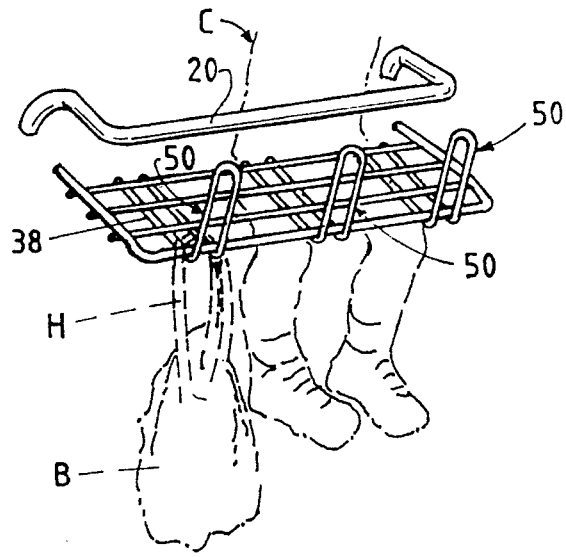
FIG. 3 is an elevational view showing one side of the luggage cart and showing, in broken lines, luggage placed on a wheeled chassis of the luggage cart and on the bottom portion of the seat and a bag with a handle hung similarly and lowered approximately to the bottom portion of the seat.

As shown in FIG. 1 and other views, a luggage cart 10 of the type noted above constitutes a preferred embodiment of this invention.

Broadly, the luggage cart 10 comprises a wheeled chassis 12, a tubular handle 14 extending upwardly from the wheeled chassis 12, and a seat 16 for a child. The tubular handle 14 has two upright portions 18 spaced laterally from each other and a gripping portion 20 joined integrally to the upright portions 18 so as to extend laterally between the upright portions 18. Two front wheels 22 are mounted to the chassis 12 via swivel casters 24 and two back wheels 26 are mounted to the chassis 12 via fixed journals 28.

The wheeled chassis 12 has a tubular frame 30 formed so as to have a front portion 32 extending laterally, two lateral portions 34 extending backwardly from the front portion 32, and two upright portions 36 extending upwardly from the lateral portions 34. The wheeled chassis 12 has additional members, as shown, which together with the front and lateral portions of the tubular frame 30 define a platform P (see FIG. 2) supporting luggage L.

As shown, the seat 16 is mounted to the upright portions 18 of the tubular handle 14 and to the upright portions 36 of the tubular frame 30 of the wheeled chassis 12 so as to extend between the upright portions 18, 36. The seat 16 has a bottom portion 38, which is fixed to the upright portions 18 of the tubular handle 14 and to the upright portions 36 of the wheeled chassis 12, and a backrest portion 40, which is hinged to the bottom portion 38. The bottom portion 38 has a front edge 42, at which the backrest portion 40 is hinged for pivotal movement, and a back edge 44. The backrest portion 40 has laterally extending ears 46, which are disposed to engage the upright portions 18 of the tubular handle 14 so as to limit pivotal movement of the backrest portion 40 frontwardly, and which are disposed to engage the upright portions 36 of the tubular frame 30 of the wheeled chassis 12 so as to limit pivotal movement of the backrest portion 40 backwardly.

At least three dividers 50 extend upwardly from the back edge 44 of the bottom portion 38 of the seat 16. The dividers 50 are spaced laterally from one another so as to define open-topped gaps to accommodate the legs of a child C (see FIG. 2) sitting on the seat 16 and extending his or her legs through the open-topped gaps. Where the gripping portion 20 is joined to the upright portions 18, the tubular handle 14 is shaped such that a child C sitting on the bottom portion 38 of the seat 16 and extending his or her legs through the open-topped gaps defined by the dividers 50 faces backwardly toward the gripping portion 20. The gripping portion 20 tends to restrain the child C against falling backwardly toward the gripping portion 20. When the child C leans backwardly while sitting on the bottom portion 38 of the seat 16, the backrest portion 40 of the seat 16 is pivoted backwardly so that the ears 46 engage the upright portions 36 of the tubular frame 30 of the wheeled chassis 12.

The tubular handle 14, the tubular frame 30 of the wheeled chassis 12, and some of the other members of the wheeled chassis 12 are made from steel tubing and are welded to one another. The bottom portion 38 of the seat 16 is formed from welded steel wires including wires 60 having looped portions 62, which are rounded at their upper ends 64, and which define the respective dividers 50.

Figure 4:
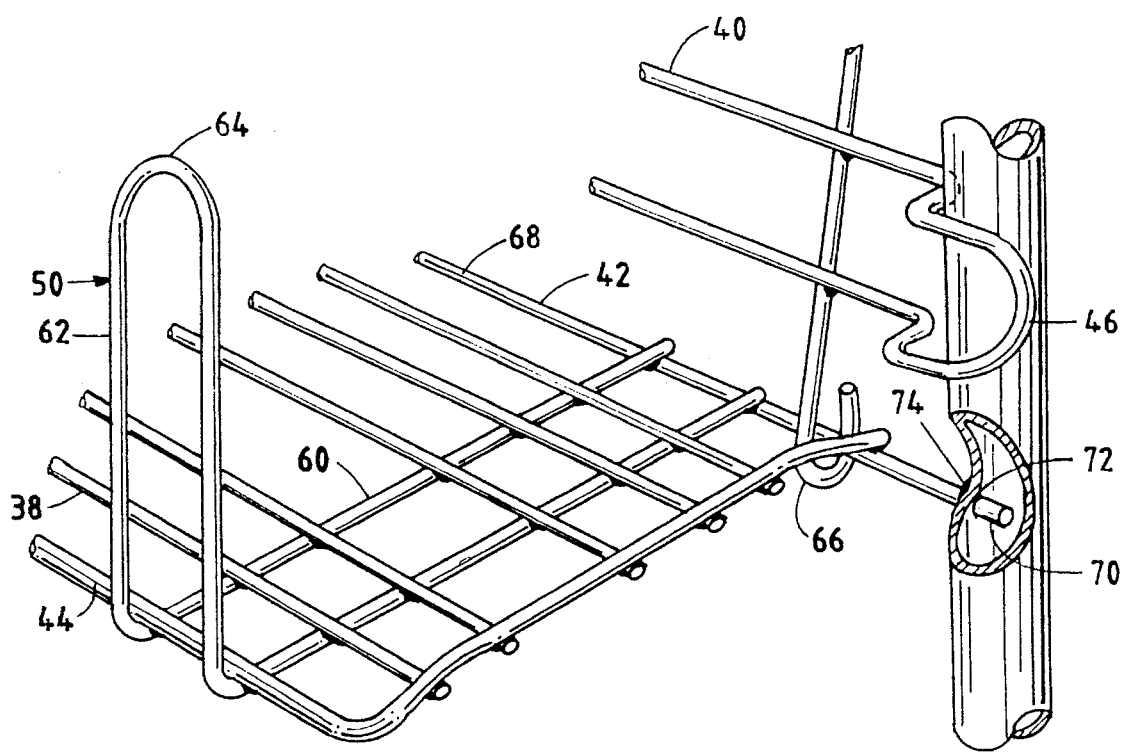
FIG. 4 is an enlarged, fragmentary, perspective detail showing how the bottom portion of the seat is mounted to a handle of the luggage cart and how a backrest portion of the seat is hinged to the bottom portion.

The backrest portion 40 of the seat 16 also is formed from welded steel wires including wires defining the ears 46 and wires having ends 66 looped around an edge wire 68 at the front edge 42 of the bottom portion 38, as shown in FIG. 4, where the backrest portion 40 is hinged to the bottom portion 38. Moreover, as shown in FIG. 4, the opposite ends 70 of the edge wire 68 are inserted into holes 72 in the upright portions 18 of the tubular handle 14 and are secured to the upright portions 18 via spot welds 74.

As shown in FIGS. 1 and 3, the luggage cart 10 has a lower basket 80, which is formed from welded steel wires. The basket 80 is mounted to the upright portions 18 of the tubular handle 14 and to the upright portions 36 of the tubular frame 30 of the wheeled chassis 12 so as to extend between the upright portions 18, 36. The basket 80 can accommodate small luggage L. Moreover, as shown in FIG. 2, the seat 16 also can accommodate small luggage L if a child is not occupying the seat 16.

According to this invention, the dividers 50 are shaped so that handles H of bags B (see FIGS. 2 and 3) or like items, such as purses, can be hung over the dividers 50 and once hung thereover can be lowered approximately to the bottom portion 38 of the seat 16. After the handles H have been lowered approximately to the bottom portion 38 of the seat 16, the bags B or like items are securely held, even if the luggage cart 10 is pushed over an uneven surface so as to cause the bags B to bounce.

Various modifications may be made in the preferred embodiment described above without departing from the scope and spirit of this invention.

I claim:

1. A wheeled cart comprising a wheeled chassis, a handle extending upwardly from a rear portion of the wheeled chassis, and a seat for a child, the handle having two upright portions spaced laterally from each other and a gripping portion extending laterally between the upright portions, the seat having a bottom portion extending rearwardly beyond the gripping portion of the handle and being mounted to the handle so as to extend between the upright portions, at least three dividers extending upwardly from the bottom portion of the seat, the dividers being spaced laterally from one another so as to define open-topped gaps open approximately to the bottom portion of the seat, the dividers defining means to accommodate the legs of a child sitting on the bottom portion of the seat and extending his or her legs through the open-topped gaps, to enable handles of bags or purses to be hung over the dividers, and to enable the handles once hung thereover to be lowered approximately to the bottom portion of the seat.

2. The wheeled cart of claim 1 wherein the handle is shaped such that a child sitting on the bottom portion of the seat and extending his or her legs through the open-topped gaps defined by the dividers faces toward the gripping portion, which tends to restrain the child against falling toward the gripping portion.

3. The wheeled cart of claim 2 wherein the bottom portion of the seat comprises welded wires, some of which define the dividers.

4. The wheeled cart of claim 3 wherein the wires defining the dividers have looped portions defining the dividers.

* * * * *

UNITED STATES PATENT AND TRADEMARK OFFICE
CERTIFICATE OF CORRECTION

PATENT NO. : 5,595,394

DATED : January 21, 1997

INVENTOR(S) : Mark Adamson

It is certified that error appears in the above-indentified patent and that said Letters Patent is hereby corrected as shown below:

Column 2, line 50, before "supporting", --for-- should be inserted

Signed and Sealed this

Twenty-third Day of September, 1997

Attest:

BRUCE LEHMAN

Attesting Officer

Commissioner of Patents and Trademarks